United States Patent [19]

Welschof et al.

[11] Patent Number: 4,784,441
[45] Date of Patent: Nov. 15, 1988

[54] PROTECTIVE BOOT SUPPORTING SLEEVE FOR UNIVERSAL JOINT IN WHEEL ASSEMBLY

[75] Inventors: Hans-Heinrich Welschof, Rodenbach; Rudolf Beier, Offenbach am Main, both of Fed. Rep. of Germany

[73] Assignee: Löhr & Bromkamp GmbH, Offenbach am Main, Fed. Rep. of Germany

[21] Appl. No.: 2,867

[22] Filed: Jan. 13, 1987

[30] Foreign Application Priority Data

Jan. 14, 1986 [DE] Fed. Rep. of Germany ....... 3600785

[51] Int. Cl.⁴ .............................................. B60B 27/02
[52] U.S. Cl. .................................. 301/124 R; 180/258; 464/178; 464/906; 384/445; 384/543; 384/589
[58] Field of Search ............... 301/124 R, 124 H, 126, 301/131; 180/258, 259, 73.3, 73.4; 384/499, 504–506, 543–544, 589, 445; 464/178, 906, 145, 175

[56] References Cited

U.S. PATENT DOCUMENTS

| | | | |
|---|---|---|---|
| 4,094,376 | 6/1978 | Welschof | 301/105 R X |
| 4,129,345 | 12/1978 | Krude | 301/105 R X |
| 4,493,676 | 1/1985 | Krude | 464/906 X |
| 4,504,099 | 3/1985 | Miki et al. | 180/259 X |
| 4,516,959 | 5/1985 | Krude | 464/175 |
| 4,536,038 | 8/1985 | Krude | 301/124 R |

Primary Examiner—Robert B. Reeves
Assistant Examiner—Russell D. Stormer
Attorney, Agent, or Firm—Toren, McGeady & Associates

[57] ABSTRACT

In a wheel assembly for a vehicle wheel, a supportive sleeve is provided mounted in rotatably fixed engagement with a hub of the wheel assembly with one side of a protective boot for the universal joint being attached thereto. The supportive sleeve is constructed as a shaped sheet metal part shaped which, during installation, is permanently plastically deformed in press-fitted engagement with a groove in the hub of the wheel assembly and is formed with a radially extending annular region which is pressed into abutting engagement with an inner bearing ring of the wheel bearing assembly.

8 Claims, 1 Drawing Sheet

PROTECTIVE BOOT SUPPORTING SLEEVE FOR UNIVERSAL JOINT IN WHEEL ASSEMBLY

The present invention is directed generally to wheel assemblies for motor vehicles and more particularly to a wheel bearing arrangement for a drive wheel of a vehicle having a hub which is rotatably supported by a roller bearing with respect to a wheel carrier member.

In devices of the type to which the present invention relates, the wheel bearing means includes an inner bearing ring which is axially fixed on a cylindrical segment of the wheel hub, with a universal joint being provided, having an inner joint member which is rotatively affixed with the hub and in which the exposed parts between the inner and outer members of the universal joint are sealed against contamination by means of a sealing boot. A sleeve is provided with the sealing boot attached at one end of the sleeve.

Arrangements of hubs and universal joints combined in a way such as that described above are known, wherein the hub and internal parts of the universal joint are designed to form an integral assembly or arranged to be connected with each other by means of radial serrations or the like. It is, for example, also known for the spherical hub of the universal joint to be slid onto splines of an extended hub member. For improvement of the filling ratio of the system of bearings, very often a divided bearing inner ring is used, which must be axially secured. Closure of the inside of the universal joint by means of a sealing boot and transition pieces which may be sleeve-like is also known, wherein the sealing boot may extend over the entire outer side of the joint outer member.

SUMMARY OF THE INVENTION

The present invention is directed toward providing simplification of the arrangement of the aforementioned type of structure, while preserving all known functions and advantages, and thus improving the fabrication of such a component.

In accordance with the present invention, a wheel assembly for a vehicle wheel is provided wherein a wheel hub is arranged to be rotatably supported on a wheel carrier member by roller bearing means including an inner bearing member axially fixed on the hub. A universal joint is arranged for transmitting torque to the wheel hub with a inner joint member of the universal joint being rotatably affixed with the hub. A protective sealing boot for the universal joint is provided with a sleeve attached to one end of the sealing boot. In accordance with the invention, the sleeve is designed as a shaped sheet metal part which is permanently plastically deformed during installation into press-fitted engagement in a region of a smaller diameter thereof with a groove formed in the hub and the sleeve is formed with a radially positioned or extending annular region which is pressed in abutting engagement with the inner bearing ring of the bearing assembly.

In accordance with the invention, the shaped sleeve assumes a double function. That is, on the one hand, the sleeve cooperates with the sealing boot to provide a protective function for the universal joint. In addition, the sleeve also operates to effect axial securement of the inner bearing ring. Contrary to conventional, essentially rigid securing elements, the sleeve of the present invention is light-weight in construction and maintains a certain amount of prestress after assembly, which is suited so as to exert a force for retention of the bearing inner ring. The installation of the sleeve in accordance with the present invention occurs, preferably after the completed installation of the wheel bearing assembly, and prior to installation of the universal joint, with the sleeve being installed from the side of the universal joint. The shaped sleeve is slid on with the help of an appropriate cylindrical ram with front, conical or cylindrical surfaces adapted to the sleeve and is pressed into the groove provided in the hub with a permanent plastic deformation. Various possibilities exist for the shape of the groove in the hub and the construction of the appropriate sleeve segment. Common to all of these is, respectively, the contact of the radially positioned annular face of the sleeve at the inner bearing ring.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DETAILED DESCRIPTION OF THE PREFERRED EMBODIMENTS

Figure 1:
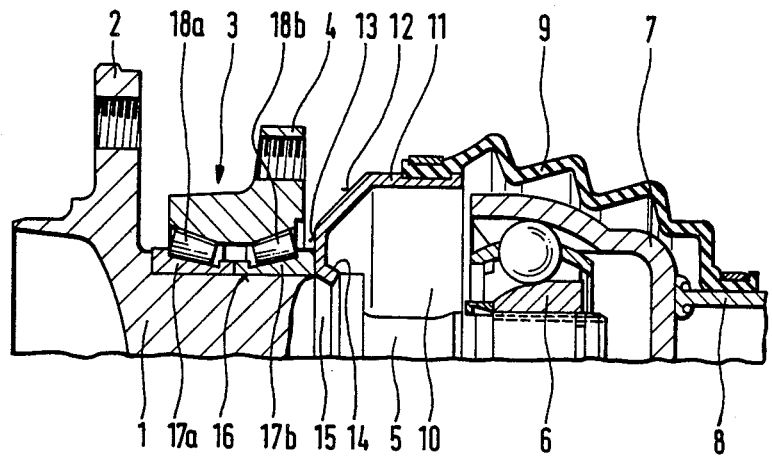
FIG. 1 is a sectional view showing an assembly in accordance with the present invention wherein a groove having a triangular cross section is provided in a cylindrical section of the hub.

Referring now to the drawings and particularly to FIG. 1, there is shown a wheel bearing assembly in accordance with the present invention comprising a wheel hub 1 having an attachment flange 2 for fastening of the wheel disk. The wheel hub 1 is rotatively supported by a wheel bearing assembly 3 which includes an outer bearing ring 4 which is also formed to operate as the wheel carrier element, whereby the outer bearing ring and the wheel carrier element are formed as a single integral unit. The wheel bearing assembly 3 also includes a split inner bearing including inner bearing rings 17a and 17b and bevel rollers 18a and 18b.

The wheel hub 1 is rotatively driven by a universal joint which includes an inner joint member 6 formed as a spherical hub and an outer joint member 7 which is engaged with a hollow shaft 8. The inner joint member 6 of the universal joint is attached with the hub 1 through a shaft lug 5 so as to be in fixed rotative engagement therewith.

A protective sealing boot 9 for the universal joint is provided which is attached at one end to the hollow shaft 8 and at its opposite end to a cylindrical segment 11 of a sleeve 10. It will be noted that the sealing boot 9 extends about the outer joint member 7 of the universal joint and provides a sealed protection for the universal joint.

The sleeve 10 is formed with an inwardly tapering conical section 12 which extends from the cylindrical segment 11. The tapering conical segment 12 is, in turn, followed by a radially positioned extending annular face 13. On the radially inner edge of the annular face 13, there is provided a lip or conical segment 14. In the original state, prior to installation, a cylindrical segment emanates from the annular face 13 and is oriented or directed toward the universal joint and located on the inside, which, on the completion of installation, engages into a triangular or V-shaped groove 15 as the lip or conical segment 14.

The hub 1 is formed with a cylindrical seating face 16 for the inner bearing rings 17a and 17b. The groove 15 is arranged directly adjacent the cylindrical seating face 16 for the inner bearing rings 17a, 17b.

Also, it will be noted that the inner bearing ring 17b of the wheel bearing 3 directly abuts against the radially extending annular face 13 of the sleeve 10.

Figure 2:
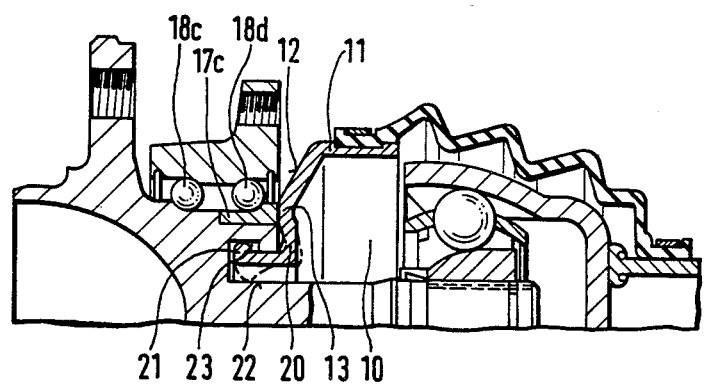
FIG. 2 is a sectional view showing an arrangement wherein there is provided a groove with a widened undercut in a radial front face of the hub.

Another embodiment of the invention is shown in FIG. 2, wherein like reference numerals are used to identify similar parts. In FIG. 2, the sleeve 10 is designed with the conical region 12 joining the outer cylindrical segment 11 and with the inwardly adjoining radially extending annular face 13. A conical portion 20 adjoins the annular face 13 (depicted in broken lines) which is crimped over in its end region, and, thus, is double-layered. In the finished assembled or installed state, this cone is reformed into a cylindrical segment 20 which engages into a groove 22 with an undercut recess 23 exhibiting a widening cross section, the groove being recessed or extending into the hub from the front face. The crimped-over end region 21 contacts herein with a front face of the recess. The annular face 13 of the sleeve 10 abuts against an inner bearing ring 17c which contains a ball bearing race, while the other ball bearing race is molded directly into the hub. The bearing is constituted with two rows of balls 18c and 18d.

Thus, it will be seen that the present invention provides a wheel bearing or hub assembly arrangement for a drive wheel of a vehicle with a hub supported on roller bearings in combination with a universal joint. In the simplified construction of the invention, on the one hand, protection for the exposed parts of the universal joint is provided and, on the other hand, also, axial abutment of the inner bearing ring with the wheel bearings is provided by a shaped sleeve fabricated from sheet metal and cooperating with the sealing boot.

Thus, the sleeve 10 operates not only to support the sealing boot 9, but it is also arranged in press-fitted engagement with its hub 1 with the annular face 13 abutting the inner bearing rings of the wheel bearing to thereby provide further support by axially affixing the inner wheel bearings of the bearing assembly.

While specific embodiments of the invention have been shown and described in detail to illustrate the application of the inventive principles, it will be understood that the invention may be embodied otherwise without departing from such principles.

What is claimed is:

1. In a wheel bearing assembly for a vehicle wheel including a hub having an axis, a wheel carrier member encircling said hub, roller bearing means rotatably supporting said hub on said wheel carrier member, said roller bearing means including an inner bearing member axially affixed on said hub inwardly of said wheel carrier member, a universal joint for transmitting torque to said hub including an inner joint member rotatively affixed with said hub, said universal joint extending from said hub in the axial direction thereof, a protective sealing boot encircling said universal joint, said boot having a first end adjacent said hub and a second end spaced more remote from said hub and said second end secured to said universal joint, and a sleeve encircling the axis of said hub and located between said hub and said universal joint, said sleeve having a first end close to said hub and a second end more remote form said hub with said sealing boot attached thereto, the improvement comprising:

that said sleeve is a shaped metal part;

said sleeve at the first end thereof is permanently plastically deformed in press-fitted engagement with a groove formed in and encircling said hub; and said sleeve adjacent the first end thereof has a radially extending annular region pressed in abutting engagement with said inner bearing ring.

2. An assembly according to claim 1, wherein said groove is generally V-shaped and has a pair of flanks with the first end of said sleeve pressed against one flank of the groove and an adjacent surface at the first end of said sleeve bears against the other flank of said groove, said annular region of said sleeve extends radially outwardly from said groove.

3. An assembly according to claim 2, wherein said hub includes a cylindrical region which forms a seat for said inner bearing ring and wherein said groove is located in said cylindrical region directly adjoining said seat.

4. An assembly according to claim 1, wherein said groove is an annular groove formed in a surface of said hub facing said universal joint located in the axially extending region of said hub within the inner bearing ring, said annular groove having an annular recess extending toward said inner bearing ring with the first end of said sleeve crimped over into said recess and said annular region of said sleeve extends radially outwardly from said annular groove towards said inner bearing ring and is pressed into abutment with said surface of the hub.

5. An assembly according to claim 4, wherein said hub includes a cylindrical region forming a seat for said inner bearing ring and the seat is bounded directly by said surface into which the annular groove is formed.

6. An assembly according to claim 1, wherein said sleeve has an elastic prestress in said annular region bearing against said inner bearing ring.

7. An assembly according to claim 1, wherein said sleeve includes a cylindrical segment extending towards said universal joint from said annular region with a groove-like recess in said cylindrical segment for receiving said sealing boot.

8. An assembly according to claim 7, wherein said cylindrical segment extending towards said universal joint has an end facing an external portion of said universal joint having a larger diameter than the remainder of said universal joint.

* * * * *